United States Patent
Gale et al.

(10) Patent No.: US 7,438,210 B2
(45) Date of Patent: Oct. 21, 2008

(54) ULTRASONIC WELDER HAVING MOTOR DRIVE ASSEMBLY INTEGRATED WITH TRANSDUCER HOUSING

(75) Inventors: Timothy S. Gale, Rochester Hills, MI (US); Kirk A. Brunssen, Waterford, MI (US); Clifford B. Madden, Almont, MI (US); Matthew E. Ballough, Clarkston, MI (US)

(73) Assignee: T.A. Systems Inc., Rochester Hills, MI (US)

( * ) Notice: Subject to any disclaimer, the term of this patent is extended or adjusted under 35 U.S.C. 154(b) by 364 days.

(21) Appl. No.: 11/480,172

(22) Filed: Jun. 30, 2006

(65) Prior Publication Data

US 2008/0000944 A1    Jan. 3, 2008

(51) Int. Cl.
 *B23K 1/06* (2006.01)
 *B32B 37/00* (2006.01)

(52) U.S. Cl. ...................... 228/1.1; 156/580.1
(58) Field of Classification Search ... 228/110.1–111.5, 228/1.1; 156/64, 173.1, 358, 580.1
See application file for complete search history.

(56) References Cited

U.S. PATENT DOCUMENTS

| | | | |
|---|---|---|---|
| 5,085,719 A | | 2/1992 | Eck |
| 5,110,381 A | * | 5/1992 | Heckard et al. ............... 156/64 |
| 5,273,799 A | | 12/1993 | Yu et al. |
| 5,286,319 A | * | 2/1994 | Gawne et al. ............. 156/73.1 |
| 5,286,586 A | | 2/1994 | Foley et al. |
| 5,431,749 A | * | 7/1995 | Messner .................... 156/358 |
| 5,552,005 A | | 9/1996 | Mammino et al. |
| 5,580,413 A | | 12/1996 | Assink et al. |
| 5,597,440 A | * | 1/1997 | Pecha ......................... 156/351 |
| 5,603,150 A | | 2/1997 | Assink et al. |
| 5,800,672 A | * | 9/1998 | Boyce et al. ............. 156/580.1 |
| 5,868,300 A | | 2/1999 | Babayan |
| 5,871,784 A | | 2/1999 | Assink et al. |
| 5,948,189 A | * | 9/1999 | Parish et al. .................. 156/64 |
| 5,985,064 A | * | 11/1999 | Sato ............................ 156/64 |
| 6,093,277 A | | 7/2000 | Assink et al. |
| 6,168,063 B1 | * | 1/2001 | Sato et al. .................... 228/1.1 |
| 6,375,770 B1 | * | 4/2002 | Meltzer et al. ............. 156/73.4 |
| 6,450,393 B1 | | 9/2002 | Doumanidis et al. |
| 6,491,785 B1 | * | 12/2002 | Sato et al. ................ 156/379.6 |
| 6,508,641 B1 | | 1/2003 | Kubik |
| 6,682,620 B2 | * | 1/2004 | Gartland et al. ............ 156/73.4 |
| 6,743,331 B2 | * | 6/2004 | Takahashi et al. ......... 156/580.2 |
| 7,017,791 B2 | * | 3/2006 | Higashiyama ............... 228/1.1 |
| 7,351,298 B2 | * | 4/2008 | Hatano ...................... 156/73.1 |
| 2005/0230025 A1 | | 10/2005 | Bates et al. |

* cited by examiner

*Primary Examiner*—Jennifer McNeil
*Assistant Examiner*—Carlos Gamino
(74) *Attorney, Agent, or Firm*—Brooks Kushman P.C.

(57) ABSTRACT

An ultrasonic welder includes a housing having an ultrasonic transducer, a horn mounted to one end of the housing, a motor having a shaft, and a mounting assembly having a fastener such as a threaded screw. One screw end is coupled to the motor shaft to rotate as the motor shaft is being driven. The other screw end extends into a threaded screw receiver running within the housing. Upon rotating in one direction, the screw engages more threads of the screw receiver such that the housing with the horn move upward. Upon rotating in the other direction, the screw engages less threads of the screw receiver such that the housing with the horn moves downward. A linear transducer extends from the mounting assembly into the housing to monitor the horn position. A pair of guide shafts extend from the mounting assembly into the housing to stabilize the horn positioning.

18 Claims, 5 Drawing Sheets

ULTRASONIC WELDER HAVING MOTOR DRIVE ASSEMBLY INTEGRATED WITH TRANSDUCER HOUSING

BACKGROUND OF THE INVENTION

1. Field of the Invention

The present invention relates to an ultrasonic welder having a motor drive assembly for positioning its ultrasonic horn.

2. Background Art

Ultrasonic welding joins plastic parts together by rapidly transmitting ultrasonic energy through a shaped tool known as an ultrasonic horn. The energy is in the form of mechanical vibrations and creates friction between the parts. The friction generates heat to melt and fuse (i.e., weld) the parts together.

An ultrasonic welder includes an ultrasonic transducer (i.e., an ultrasonic converter). The transducer is housed within a bottom portion of a housing of the welder. The horn is mounted to the bottom end of the transducer and is located adjacent to the bottom housing portion. The transducer is a piezoelectric element that mechanically vibrates upon receiving electricity. The vibration frequency typically falls within a range of 10-50 kHz. As the transducer vibrates at a given frequency, the horn incrementally moves up and down at the same frequency (for instance, on the order of $\pm 0.0004$ inches per cycle).

In order to weld two parts together, the two parts are placed on top of one another. The horn is then brought into forced contact with the top part while the bottom part is supported on a stationary surface. As the transducer vibrates upon being supplied with electricity, the horn reciprocates vertically such that the horn resonates toward and away from the top part. The horn reciprocation in relation to the parts (i.e., the transfer of vibratory energy from the horn to the parts) creates the heat which fuses the parts together.

An ultrasonic welder typically includes either an air drive assembly or a motor drive assembly for positioning the horn relative to the parts (i.e., for moving the horn towards the parts to bring the horn into forced contact with the parts and for moving the horn away from the parts such that the horn is not in contact with the parts).

A typical air drive assembly includes an air cylinder having an actuator connected to the transducer housing. Compressed air forced into the cylinder causes the actuator to extend out from the cylinder to thereby move the transducer housing and the horn away from the cylinder until the horn contacts the top part. After the parts are welded together, compressed air forced into the cylinder causes the actuator to retract back into the cylinder to thereby move the transducer housing and the horn back toward the cylinder and away from the parts. Problems with air drive assemblies include the presence of an air source, precise movement of the actuator is not obtainable as compressed air is the mechanism which moves the actuator, and the air pressure which may realistically provided to the cylinder is relatively low resulting in forces applied by the horn onto the parts being relatively low and inconsistent.

A typical motor drive assembly includes a motor having a rotatable drive shaft connected to the exterior surface of the top face of the transducer housing. The motor is driven in response to an electrical signal to rotate the drive shaft one way causing the transducer housing and the horn to move away from the motor and toward the parts until the horn contacts the top part. After the parts are welded together, the motor is driven in response to another electrical signal to rotate the drive shaft the other way causing the transducer housing and the horn to move back toward the motor and away from the parts.

In addition to not using compressed air, advantages associated with a typical motor drive assembly include precise horn positioning as a result of electronically controlling the motor. Electronic motor control also provides indirect information regarding the positioning of the horn (for example, by monitoring the revolutions of the drive shaft and the like). A position transducer which directly monitors movement of the horn may be employed to provide information regarding the horn positioning.

However, a problem with an ultrasonic welder having a typical motor drive assembly is that drive components of the motor drive assembly are not integral with the transducer housing. For instance, the drive shaft is connected to the exterior surface of the top face of the transducer housing. Consequently, the overall size including the height of the ultrasonic welder is relatively large. Another problem with an ultrasonic welder having a typical motor drive assembly is that the drive components do not linearly guide the horn while positioning the horn. For instance, the drive shaft, as well as any other drive components such as guide shafts, are connected to the exterior surface of the top transducer housing face. Because the horn is mounted to the bottom transducer housing face, unintentional linear movement of the horn relative to the top transducer housing end (i.e., "wobbling") can occur when the horn is in forced contact with the parts to be welded.

SUMMARY OF THE INVENTION

Accordingly, it is an object of the present invention to provide an ultrasonic welder having a motor drive assembly and an ultrasonic transducer housing in which the motor drive assembly is integrated with the ultrasonic transducer housing.

It is another object of the present invention to provide an ultrasonic welder having a motor drive assembly integrated with an ultrasonic transducer housing for electronically controlling the movement and positioning of an ultrasonic horn mounted to the ultrasonic transducer housing.

It is a further object of the present invention to provide an ultrasonic welder having a motor drive assembly integrated with an ultrasonic transducer housing such that an ultrasonic horn mounted to the ultrasonic transducer housing is linearly guided as the ultrasonic horn is brought into forced contact with parts to be welded.

It is still another object of the present invention to provide an ultrasonic welder having a motor drive assembly integrated with an ultrasonic transducer housing for electronically controlling the pressure applied by an ultrasonic horn mounted to the ultrasonic transducer housing onto parts to be welded.

In carrying out the above object and other objects, the present invention provides a welder having a housing, vibration means, a horn, a motor having a shaft, and a mounting assembly. The housing has a fastener receiver which extends from within the housing out through the top end of the housing. The vibration means (such as an ultrasonic transducer) is mounted within the housing adjacent to the bottom end of the housing. The horn (such as an ultrasonic horn) is mounted to the bottom end of the housing such that the horn vibrates as the vibration means vibrate. The mounting assembly has a body and a fastener. The top end of the fastener is connected within the mounting assembly body to the motor shaft such that the fastener rotates as the motor shaft is being driven. The bottom end of the fastener extends out of the mounting assembly body through the top end of the housing into a portion of the fastener receiver. The fastener pulls the housing with the horn vertically upward towards the mounting assembly body upon rotation of the fastener in a first direction causing the fastener to extend into a larger portion of the fastener receiver. The fastener pushes the housing with the horn vertically downward away from the mounting assembly body upon rotation of the fastener in a second direction opposite the first direction causing the fastener to extend into a smaller portion of the fastener receiver.

The housing may further include a pair of shaft openings extending from within the housing out through the top end of the housing. In this case, the mounting assembly further includes a pair of guide shafts. The top guide shaft ends are fixed in place within the mounting assembly body and the bottom guide shaft ends extend out of the mounting assembly body through the top end of the housing into portions of the respective shaft openings to thereby provide linear rigidity to the horn as the horn is brought into forced contact with parts to be welded. The bottom guide shaft ends extend into larger (smaller) portions of the respective shaft openings as the housing with the horn move vertically upward (downward) towards (away from) the mounting assembly body.

The welder may further include a linear transducer operable for generating a position signal indicative of a location along its length that is being pinched. In this case, the housing further includes a sensor receiver opening extending from within the housing out through the top end of the housing. The top end of the linear transducer is fixed in place within the mounting assembly body and the bottom end of the linear transducer extends out of the mounting assembly body through the top end of the housing into the sensor receiver opening. The sensor receiver opening includes a pinching insert which pinches the linear transducer at a given location along the length of the linear transducer whereby the position signal generated by the linear transducer is indicative of the vertical location of the horn relative to the mounting body assembly. The bottom linear transducer end extends into a larger (smaller) portion of the sensor receiver opening as the housing with the horn move vertically upward (downward) towards (away from) the mounting assembly body.

Preferably, the fastener receiver is a threaded screw receiver and the fastener is a threaded screw. The housing may further include a nut which is mounted to the top end of the housing, extends within a portion of the housing, and is secured around the threaded screw receiver. The housing may further include a set screw positioned adjacent to the threaded screw receiver to set a maximum limit of the extension of the screw into the threaded screw receiver.

In operation, the motor shaft is driven upon the motor receiving an electrical signal from a processor such as a programmable logic converter (PLC) or a personal computer (PC). The linear transducer provides the position signal to the processor for the processor to monitor the position of the horn in order to provide proper electrical signals to the motor to effect a desirous welding result.

Further, in carrying out the above objects and other objects, the present invention provides an ultrasonic welder having a housing, an ultrasonic transducer mounted within the housing adjacent to the bottom end of the housing, an ultrasonic horn mounted to the bottom end of the housing such that the horn vibrates as the transducer is supplied with power, a motor, and a threaded screw rotatable in first and second opposite directions. The housing includes a threaded screw receiver extending longitudinally within a portion of the housing above the bottom end of the housing and out through the top end of the housing. The top end of the screw is connected to the motor shaft such that the screw rotates as the motor shaft is being driven. The bottom end of the screw longitudinally extends through the top end of the housing into the threaded screw receiver. The screw extends further into the threaded screw receiver by engaging more threads of the threaded screw receiver as the screw rotates in the first direction such that the housing with the horn move vertically upward. The screw extends further out of the threaded screw receiver by engaging less threads of the threaded screw receiver as the screw rotates in the second direction such that the housing with the horn move vertically downward.

The housing may further include a pair of shaft openings extending longitudinally within respective portions of the housing above the bottom end of the housing and out through the top end of the housing. In this case, the welder further includes a pair of guide shafts with the top guide shaft ends being fixed in place to a housing of the motor and the bottom guide shaft ends longitudinally extending through the top end of the housing into portions of the respective shaft openings to thereby provide linear rigidity to the horn as the horn is brought into forced contact with parts to be welded.

The welder may further include a linear transducer operable for generating a position signal indicative of a location along its length that is being pinched. In this case, the housing further includes a sensor receiver opening longitudinally extending within a portion of the housing above the bottom end of the housing and out through the top end of the housing. The top end of the linear transducer is fixed in place to the motor housing and the bottom end of the linear transducer longitudinally extends through the top end of the housing into the sensor receiver opening. The sensor receiver opening includes a pinching insert which pinches the linear transducer at a given location along the length of the linear transducer whereby the position signal generated by the linear transducer is indicative of the vertical location of the horn relative to the given location.

The above objects, other objects, and advantages of the present invention are readily apparent from the following detailed descriptions thereof when taken in connection with the accompanying drawings.

DETAILED DESCRIPTION OF THE PREFERRED EMBODIMENT(S)

Figure 1:
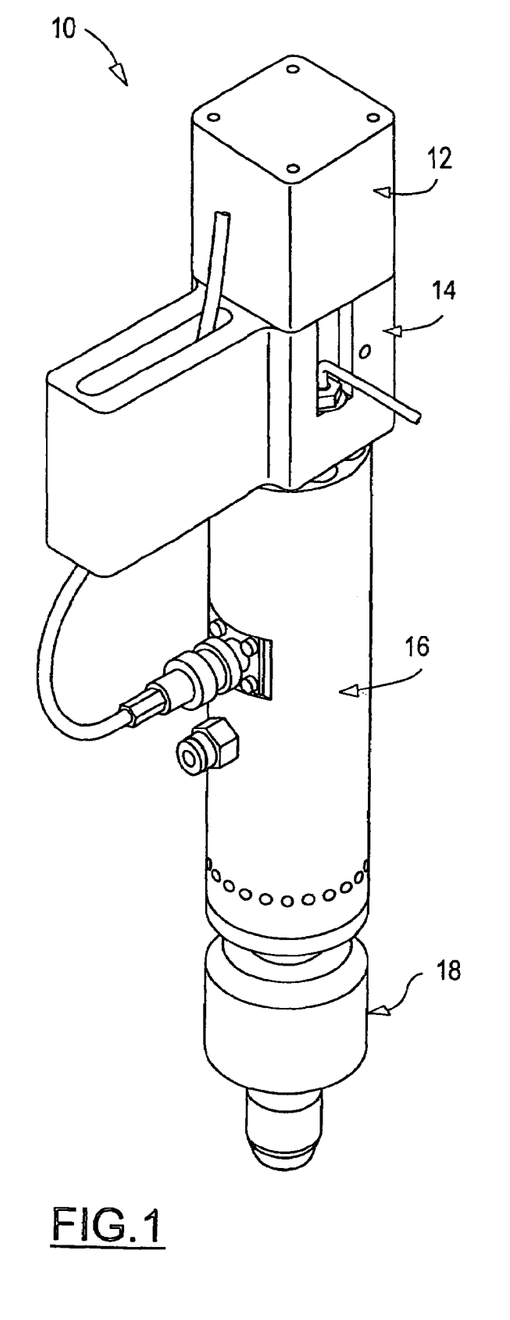
FIG. 1 illustrates a perspective view of an ultrasonic welder in accordance with an embodiment of the present invention in which the ultrasonic welder is in a retracted position.
Figure 2:
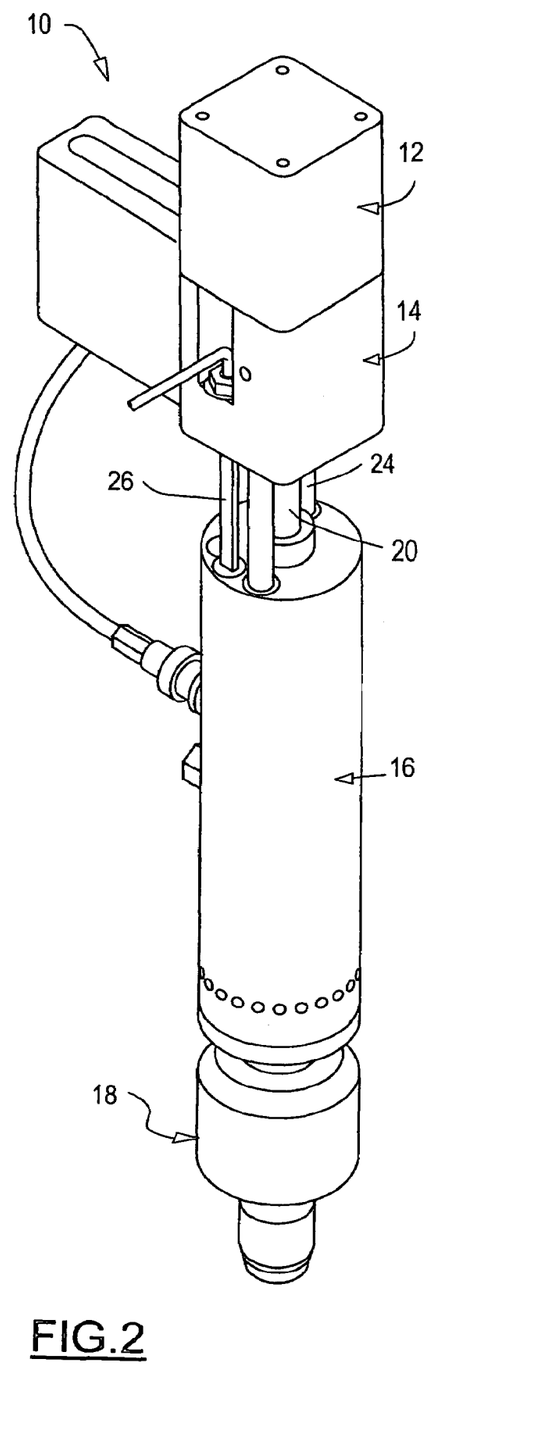
FIG. 2 illustrates a perspective view of the ultrasonic welder rotated by about 90° with respect to the view shown in FIG. 1 in which the ultrasonic welder is in an engaged position.

Referring now to FIGS. 1 and 2, perspective views of an ultrasonic welder 10 in accordance with an embodiment of the present invention are shown. FIG. 1 illustrates welder 10 in a retracted position and FIG. 2 illustrates the welder in an engaged position. The perspective view shown in FIG. 2 is rotated by about 90° with respect to the perspective view shown in FIG. 1.

Welder 10 includes a motor 12, a mounting bar assembly 14, and an ultrasonic transducer housing 16. Motor 12, mounting bar assembly 14, and transducer housing 16 are connected to one another such that the transducer housing is vertically movable relative to the bodies of the motor and the mounting bar assembly. Mounting bar assembly 14 is connected at a top end of its body to motor 12 and a bottom portion of the mounting bar assembly is integrally connected within transducer housing 16 such that the mounting bar assembly connects the motor and the transducer housing to one another. Mounting bar assembly 14 transfers rotary energy of motor 12 to the bottom mounting bar assembly portion in order to vertically move transducer housing 16 relative to the mounting bar assembly body. For instance, as shown in FIG. 1, transducer housing 16 is vertically moved upward to be positioned adjacent to the body of mounting bar assembly 14. As a result, welder 10 is in the retracted position. Conversely, as shown in FIG. 2, transducer housing 16 is moved vertically downward to be positioned away from the body of mounting bar assembly 14. As a result, welder 10 is in the engaged position.

An ultrasonic horn 18 is mounted to the bottom end of transducer housing 16. As transducer housing 16 vertically moves relative to the body of mounting bar assembly 14, horn 18 moves with the transducer housing and, consequently, also vertically moves relative to the mounting bar assembly body. In the retracted position of welder 10, horn 18 is intended to be vertically moved upward and away from parts to be welded by the welder. Accordingly, horn 18 is not in contact with the parts and is disengaged from the parts when welder 10 is in the retracted position. In the engaged position of welder 10, horn 18 is intended to be vertically moved downward and toward the parts until the horn is brought into forced contact with the parts. Accordingly, horn 18 is in contact and engaged with the parts when welder 10 is in the engaged position.

Motor 12 is preferably a stepper motor having a drive shaft rotatable in clockwise and counter-clockwise directions. Upon receiving a first electrical signal, motor 12 rotates the drive shaft in the clockwise direction. Upon receiving a second electrical signal, motor 12 rotates the drive shaft in the counter-clockwise direction. Motor 12 rotates the drive shaft at varying speeds depending upon the electrical signals. A processor such as a programmable logic controller (PLC) provides the electrical signals to motor 12. The rotation speed of the drive shaft and the amount of drive shaft rotations may be determined from the electrical signals provided to motor 12. This information is indirectly indicative of the position of an element (such as horn 18) which is being moved in response to rotation of the drive shaft.

As indicated above, mounting bar assembly 14 is connected at the top end of its body to motor 12. Mounting bar assembly 14 includes a screw 20 which is rotatable in clockwise and counter-clockwise directions. Screw 20 extends out from the bottom end of the mounting bar assembly body. Mounting bar assembly 14 includes a coupler within the mounting bar assembly body. The coupler connects the top end of screw 20 to the drive shaft of motor 12 and couples rotary motion of the drive shaft to the screw causing the screw to rotate in the same direction and speed at which the drive shaft rotates. As will be explained in greater detail below, the body of screw 20 is integrally connected to a threaded screw receiver within transducer housing 16 such that rotation of the screw relative to the threaded screw receiver causes the transducer housing and horn 18 to vertically move upward and downward. In particular, rotation of screw 20 in one of the clockwise and counter-clockwise directions causes the screw to effectively pull transducer housing 16 with horn 18 vertically upward and toward the body of mounting bar assembly 14. In this case, screw 20 extends into more of the threaded screw receiver as transducer housing 16 vertically moves upward. Likewise, rotation of screw 20 in the other direction, in conjunction with the downward weight of transducer housing 16, causes the screw to effectively push the transducer housing with horn 18 vertically downward and away from the body of mounting bar assembly 14. In this case, screw 20 extends into less of the threaded screw receiver as transducer housing 16 vertically moves downward.

Mounting bar assembly 14 further includes a pair of linear guide shafts 22 and 24. The top ends of guide shafts 22 and 24 are fixedly mounted within the body of mounting bar assembly 14. Guide shafts 22 and 24 extend out from the bottom end of the mounting bar assembly body and into transducer housing 16. Guide shafts 22 and 24 are respectively received within shaft housings located inside transducer housing 16. Because guide shafts 22 and 24 are fixedly mounted to the body of mounting bar assembly 14, the shaft housings move relative to guide shafts 22 and 24 such that the shaft housings encompass varying portions of the guide shafts as transducer housing 16 vertically moves. Particularly, the shaft housings encompass more of the length of guide shafts 22 and 24 as transducer housing 16 vertically moves upward and encompass less of the length of the guide shafts as the transducer housing vertically moves downward.

Mounting bar assembly 14 further includes a linear transducer (i.e., a displacement sensor) 26. A top end of linear transducer 26 is fixedly mounted within the body of mounting bar assembly 14. Linear transducer 26 extends out from the bottom end of mounting bar assembly 14 and into a sensor receiver housing within transducer housing 16. Because linear transducer 26 is fixedly mounted within the body of mounting bar assembly 14, transducer housing 16 and the sensor receiver housing move relative to the linear transducer as the transducer housing vertically moves up and down. Linear transducer 26 generates a position signal indicative of its linear position relative to transducer housing 16 at a given time. As such, linear transducer 26 monitors the position of horn 18 as transducer housing 16 vertically moves. Further, position signals generated by linear transducer 26 at different times are indicative of the speed at which horn 18 moves as transducer housing 16 vertically moves.

Transducer housing 16 is a tubular structure having a barrel or can like shape. The bottom portion of transducer housing 16 houses an ultrasonic transducer (i.e., an ultrasonic converter). The transducer is a piezoelectric element that mechanically vibrates upon receiving electricity. As horn 18 is mounted to the bottom end of transducer housing 16, the horn incrementally moves up and down at the frequency at which the transducer vibrates. Reciprocation of horn 18 in relation to parts to be welded together creates heat which welds the parts together when the horn is in forced contact with the parts.

Figure 3:
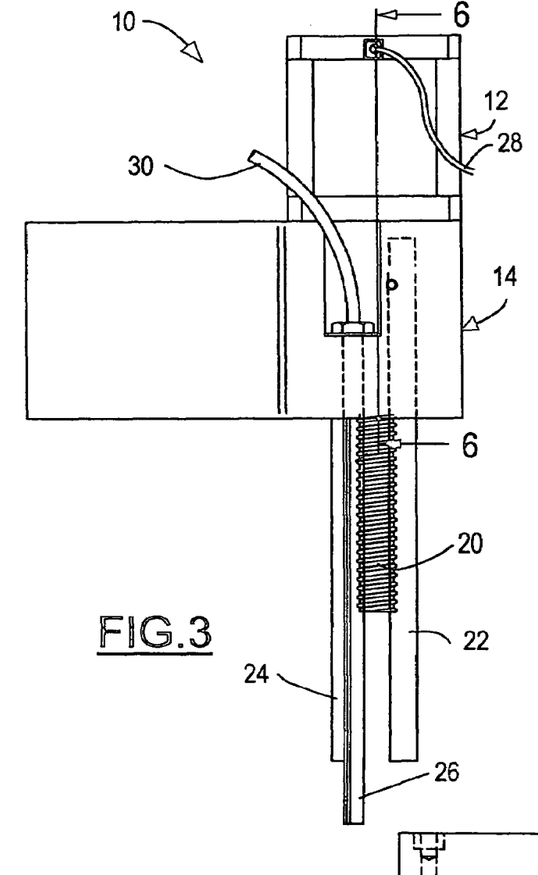
FIG. 3 illustrates a side view of the motor and the mounting bar assembly of the ultrasonic welder.
Figure 4:
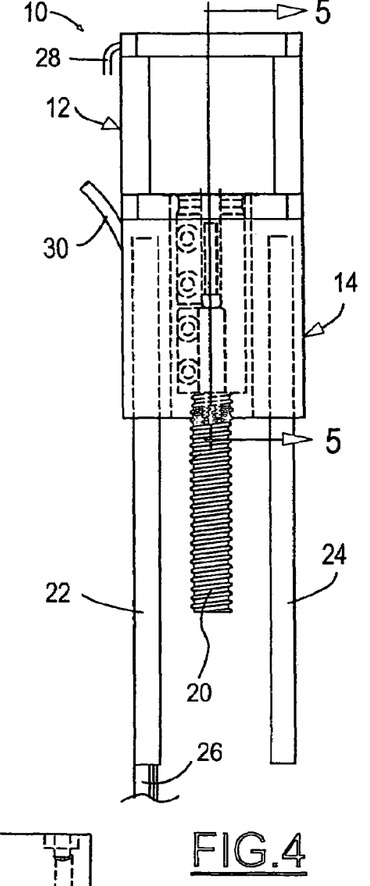
FIG. 4 illustrates a frontal view of the motor and the mounting bar assembly of the ultrasonic welder.

Referring now to FIGS. 3 and 4, with continual reference to FIGS. 1 and 2, side and frontal views of motor 12 and mounting bar assembly 14 of welder 10 are respectively shown. Motor 12 includes a communications line 28 which connects the motor to a processor such as a PLC. Motor 12 receives electrical control and power signals from the PLC via communications line 28. In turn, motor 12 drives its drive shaft in response to receipt of such signals. Linear transducer 26 includes a communications line 30 which connects the linear transducer to a processor such as the PLC. Linear transducer 26 communicates the position signals that it generates while monitoring the vertical position of transducer housing 16 (and consequently the vertical position of horn 18) to the processor via communications line 30. In turn, the processor processes the position signals to determine the position of horn 18 as well as the rate of speed at which the horn is vertically moved. The processor may use such information to provide the proper control and power signals to motor 12 in order to achieve a desirous effect with respect to the movement and positioning of horn 18 during welding operations.

As shown in FIG. 3, a top portion of linear transducer 26 extends within the body of mounting bar assembly 14 and connects with communications line 30. The top portion of linear transducer 26 is fixedly mounted within the body of mounting bar assembly 14 such that the linear transducer remains stationary in place relative to the mounting bar assembly at all times. A bottom portion of linear transducer 26 extends out from the body of mounting bar assembly 14 as shown in FIGS. 3 and 4. The bottom portion of linear transducer 26 extends into transducer housing 16 (not shown in FIGS. 3 and 4).

As shown in FIG. 4, top portions of guide shafts 22 and 24 extend within the body of mounting bar assembly 14. (FIG. 3 illustrates the top portion of guide shaft 22 extending within the body of mounting bar assembly 14.) The top portions of guide shafts 22 and 24 are fixedly mounted within the body of mounting bar assembly 14 such that the guide shafts remain stationary in place relative to the mounting bar assembly at all times. Bottom portions of guide shafts 22 and 24 extend into transducer housing 16 (not shown in FIGS. 3 and 4).

The lengths and mounting positions of guide shafts 22 and 24 are the same. The bottom portions of guide shafts 22 and 24 extend within shaft housings of transducer housing 16 to effectively linearly guide horn 18 as the horn is brought into forced contact with parts to be welded. Preferably, linear transducer 26 has a slightly longer length extending out from the body of mounting bar assembly 14 than the length of the bottom portions of guide shafts 22 and 24. In this way, linear transducer 26 is able to monitor the position of transducer housing 16 and horn 18 in a position range greater than the bottom portion length of the guide shafts.

Preferably, the bottom portion length of guide shafts 22 and 24 is greater than the length of screw 20 extending out from the body of mounting bar assembly 14. As explained in further detail below, the length of screw 20 is a factor which defines the vertical movement range of transducer housing 16 and horn 18. As such, because the bottom portion length of guide shafts 22 and 24 is greater than the length of screw 20, the guide shafts are able to provide a relatively greater amount of linear guiding to horn 18 as the horn is brought into forced contact with parts to be welded.

Figure 5:
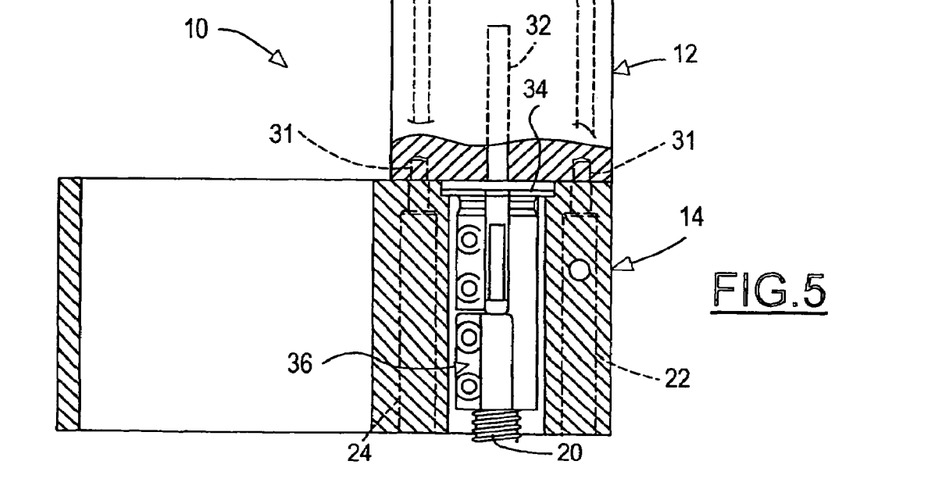
FIG. 5 illustrates a cross-sectional side view of the motor and the mounting bar assembly taken along the line 5-5 of FIG. 4.
Figures 6, 7, 8, 9:
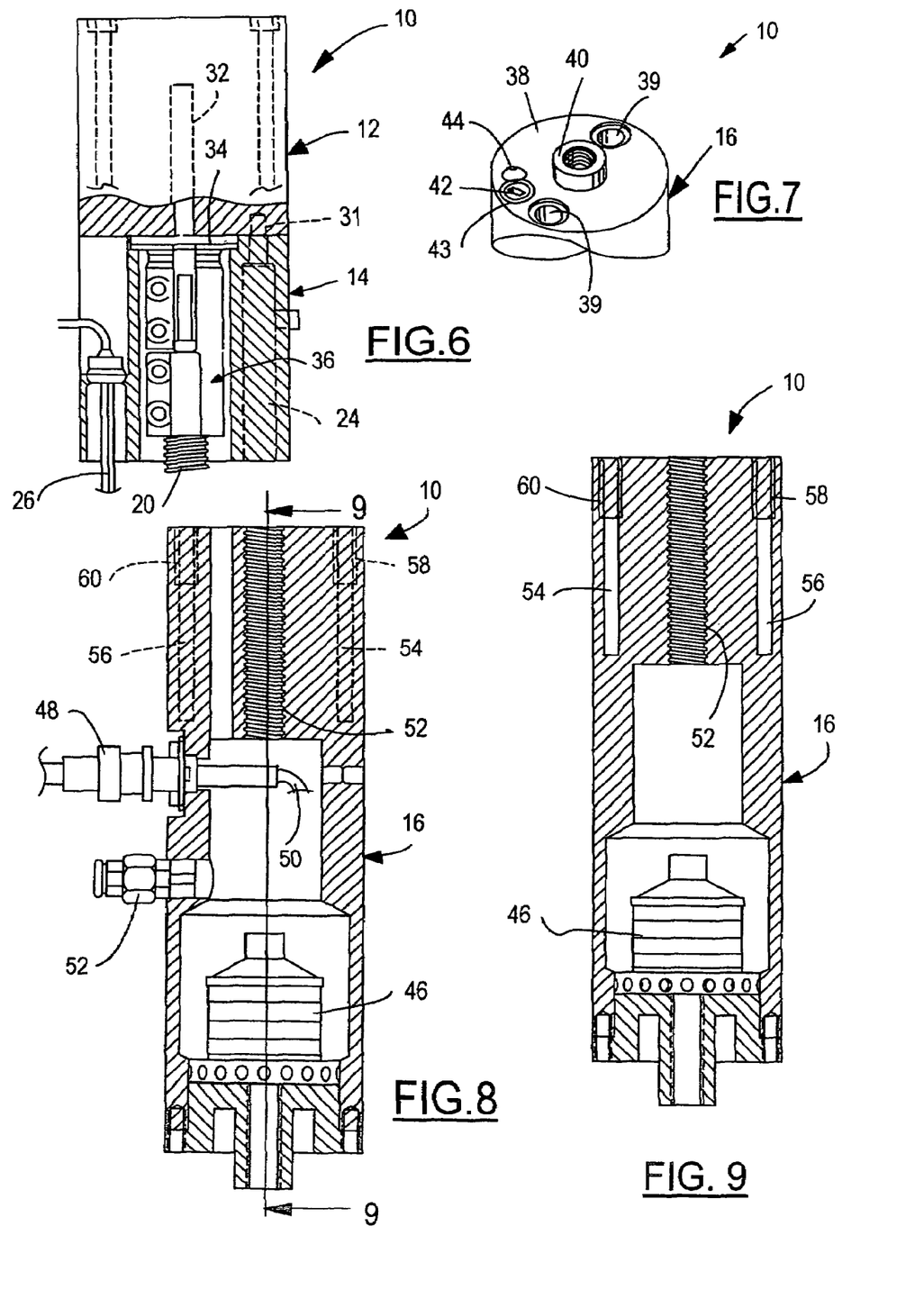
FIG. 6 illustrates a cross-sectional frontal view of the motor and the mounting bar assembly taken along the line 6-6 of FIG. 3.
FIG. 7 illustrates the top end of the ultrasonic transducer housing of the ultrasonic welder.
FIG. 8 illustrates a cross-sectional side view of the ultrasonic transducer housing of the ultrasonic welder.
FIG. 9 illustrates a cross-sectional frontal view of the ultrasonic transducer housing of the ultrasonic welder taken along the line 9-9 of FIG. 8.

Referring now to FIGS. 5 and 6, with continual reference to FIGS. 1 through 4, cross-sectional side and frontal views of motor 12 and mounting bar assembly 14 of welder 10 are respectively shown. A pair of pins 31 are used to connect the top end of mounting bar assembly 14 to motor 12. Pins 31 extend from the top ends of the top portions of guide shafts 22 and 24 into the body of motor 12. During assembly of welder 10, guide shafts 22 and 24 are pushed up towards the motor body causing pins 31 to be received into corresponding receptacles within the body of the motor to connect the top end of mounting bar assembly 14 to motor 12.

Motor 12 includes rotatable drive shaft 32 which also connects to mounting bar assembly 14. Mounting bar assembly 14 includes a bearing washer and a roller bearing assembly 34. A lower portion of drive shaft 32 extends out of the body of motor 12, through bearing washer and roller bearing assembly 34, and into a coupler 36 located within the body of mounting bar assembly 14. Coupler 36 connects drive shaft 32 to rotatable screw 20 such that rotary motion of the drive shaft is transferred to the screw. As such, screw 20 rotates as drive shaft 32 rotates.

Referring now to FIG. 7, with continual reference to FIGS. 1 through 6, the top end of transducer housing 16 of welder 10 is shown. The shaft housings located within transducer housing 16 include openings 39 on top face 38 of the top end of the transducer housing. Guide shafts 22 and 24 are inserted through respective ones of openings 39 to extend into transducer housing 16 and within their respective shaft housings inside the transducer housing.

The threaded screw receiver located within transducer housing 16 has a threaded opening portion extending out from top face 38 of the top end of the transducer housing. A nut 40, mounted onto top face 38 of the top end of the transducer housing and extending within a portion of transducer housing 16 around the threaded screw receiver, is secured around the threaded opening portion. Nut 40 functions as a bearing to hold threaded screw receiver in place as screw 20 rotates within the threaded screw receiver. Further, nut 40 meets the body of mounting bar assembly 14 when welder 10 is in the retracted position and, as such, helps define the upper limit of vertical movement of transducer housing 16.

The sensor receiver housing located within transducer housing 16 includes an opening 42 on top face 38 of the top end of the transducer housing. Linear transducer 26 is inserted through sensor receiver housing opening 42 to extend into transducer housing 16 and within the sensor receiver housing inside the transducer housing. A linear transducer pincher insert 43 is mounted within sensor receiver housing opening 42. A fastening mechanism such as a screw 44 fastened onto the top end of transducer housing 16 may be used to secure linear transducer pincher insert 42 within sensor receiver housing opening 42.

Linear transducer pincher insert 43 pinches or squeezes linear transducer 26 at the location of top face 38 of top end of transducer housing 16. Linear transducer 26 is operable to sense this pinching as well as to sense where this pinching is occurring along its length. Thus, linear transducer 26 can sense which portion of its length is adjacent to top face 38 of the top end of transducer housing 16. As described above, because linear transducer 26 is fixedly mounted within the body of mounting bar assembly 14, transducer housing 16 moves relative to the linear transducer as the transducer housing vertically moves up and down. As such, linear transducer pincher insert 43, which is secured within transducer housing 16, pinches different points of linear transducer 26 as the transducer housing 16 vertically moves up and down. By sensing which portion of its length is being pinched, linear transducer 26 is able to determine the position of transducer housing 16 and horn 18. In turn, linear transducer 26 generates position signals indicative of the positioning and movement of horn 18 at any given time or at any given time range.

Referring now to FIGS. 8 and 9, with continual reference to FIGS. 1 through 7, cross-sectional side and frontal views of transducer housing 16 of welder 10 are respectively shown. A bottom portion of transducer housing 16 houses an ultrasonic transducer 46. Horn 18 is mounted to the bottom portion of transducer housing 16 (not shown in FIGS. 8 and 9). An electronic connector 48 extends through a side wall of transducer housing 16. A connection line 50 connects (not shown) electronic connector 48 to transducer 46. A processor provides electronic control and power signals to transducer 46 via electronic connector 48 and connection line 50. In turn, transducer 46 mechanically vibrates upon receipt of such signals as is known in the art. An air cooling port 52 may also extend through a side wall of transducer housing 16 to cool the interior of transducer housing 16 and transducer 46 if desired.

Transducer housing 16 includes threaded screw receiver 52 located within the transducer housing for receiving screw 20 of mounting bar assembly 14. Screw 20 integrally connects to threaded screw receiver 20 such that rotation of the screw relative to the threaded screw receiver causes transducer housing 16 and horn 18 to vertically move upward and downward. A set screw at the bottom portion of threaded screw receiver 52 may be employed to limit the downward movement of screw 20 relative to threaded screw receiver 52.

Transducer housing 16 further include a pair of shaft housings 54 and 56 located within the transducer housing for respectively receiving the pair of linear guide shafts 22 and 24 of mounting bar assembly 14. Guide shafts 22 and 24 extend into transducer housing 16 and into their respective shaft housings 54 and 56. As transducer housing 16 vertically moves, shaft housings 54 and 56 vertically move relative to guide shafts 22 and 24 such that the shaft housings encompass varying portions of the guide shafts. Shaft housings 54 and 56 are respectively associated with sleeve bearings 58 and 60 which are used to provide structural stability to the shaft housings 54 and 56 as the shaft housings move relative to guide shafts 22 and 24. Although not explicitly shown, shaft housings 54 and 56 extend out from their bottom ends into a middle hollow portion of transducer housing 16.

Transducer housing 16 further includes sensor receiver housing 62 located within the transducer housing for receiving linear transducer 26 of mounting bar assembly 14. As transducer housing 16 vertically moves, sensor receiver housing 62 vertically moves relative to linear transducer 26 such that linear transducer pincher insert 43 pinches different locations of the linear transducer along the length of the linear transducer. Again, although not explicitly shown, sensor receiver housing 62 extends out from its bottom end into the middle hollow portion of transducer housing 16.

Figure 10:
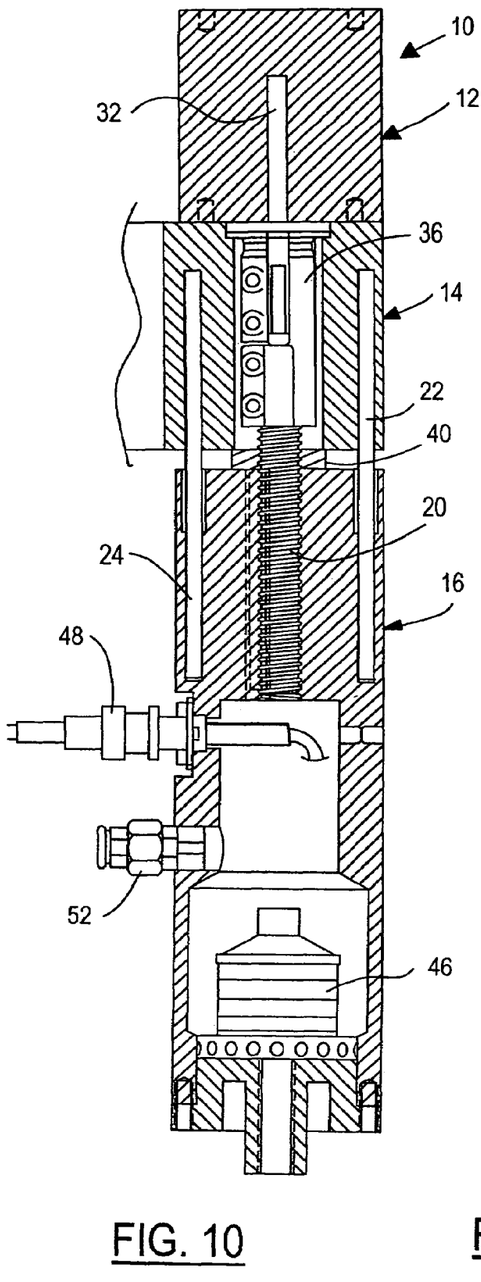
FIG. 10 illustrates a cross-sectional side view of the ultrasonic welder minus the ultrasonic horn in which the ultrasonic welder is in the retracted position.
Figure 11:
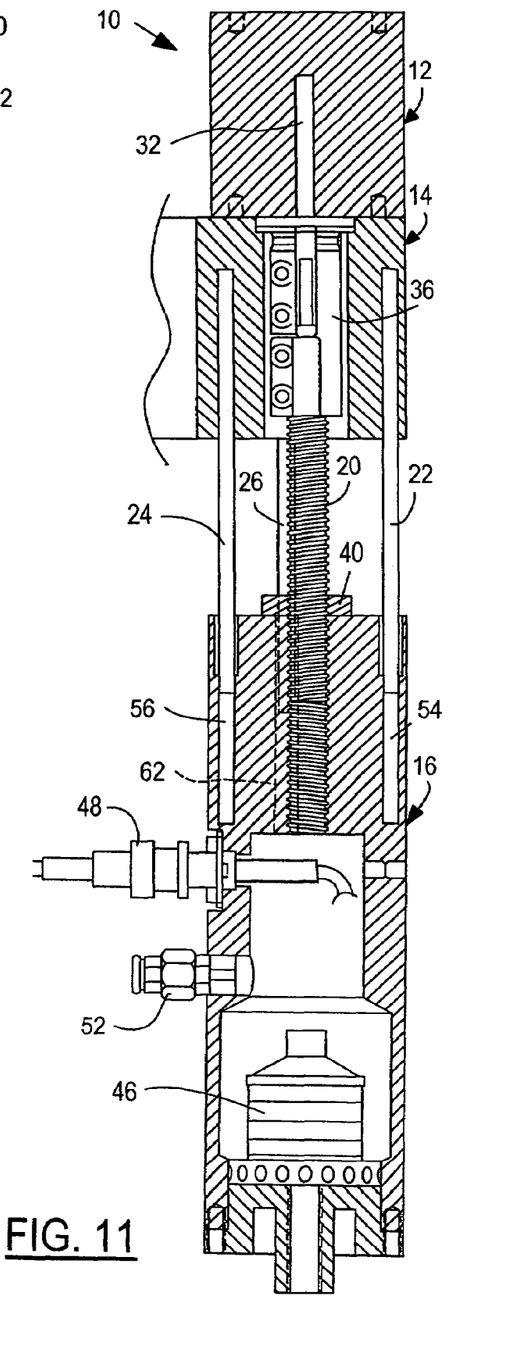
FIG. 11 illustrates a cross-sectional side view of the ultrasonic welder minus the ultrasonic horn in which the ultrasonic welder is in the engaged position.

Referring to FIGS. 10 and 11, with continual reference to FIGS. 1 through 9, cross-sectional side views of welder 10 in the retracted and engaged positions are respectively shown. Further, referring to FIGS. 12 and 13, with continual references to FIGS. 1 through 11, cross-sectional frontal views of welder 10 in the retracted and engaged positions are respectively shown.

Figures 12, 13:
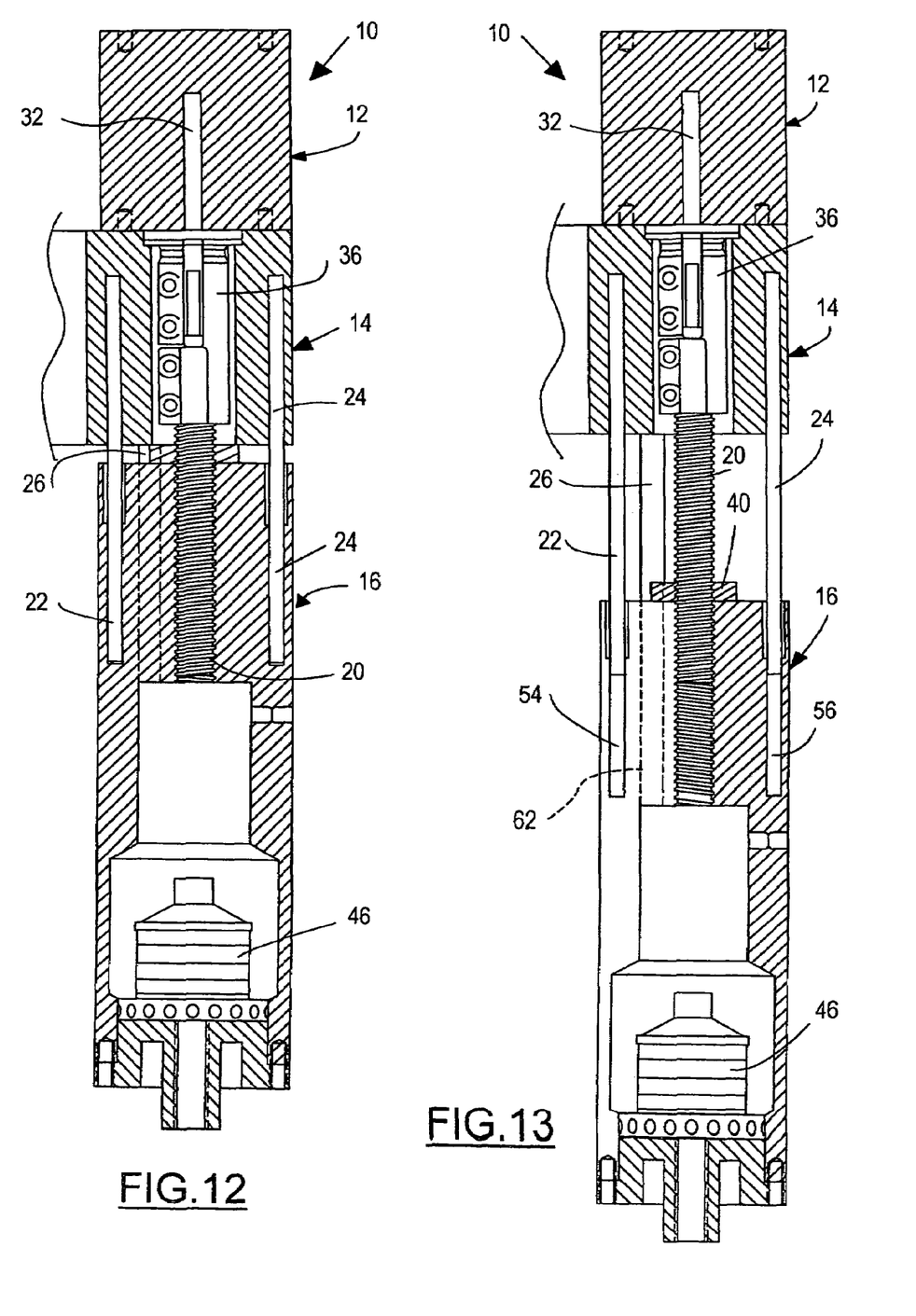
FIG. 12 illustrates a cross-sectional frontal view of the ultrasonic welder minus the ultrasonic horn in which the ultrasonic welder is in the retracted position.
FIG. 13 illustrates a cross-sectional frontal view of the ultrasonic welder minus the ultrasonic horn in which the ultrasonic welder is in the engaged position.

As indicated above, the retracted position is for moving horn 18 away from contact with parts (which may have just been welded together by welder 10). As such, in the retracted position, the top body portion of transducer housing 16 is positioned adjacent to the bottom body portion of mounting bar assembly 14. Screw 20 extends as far as it can within threaded screw receiver 52 of transducer housing 16, guide shafts 22 and 24 extend all the way through shaft housings 54 and 56 of the transducer housing, and linear transducer 26 extends all the way through sensor receiver housing 62 of the transducer housing. In operation, screw 20 is rotated upon being driven by motor 12 to engage more threads of threaded screw receiver 52 in order to move down into the threaded screw receiver. This effectively vertically pulls transducer housing 16 toward mounting bar assembly 14. As transducer housing 16 vertically moves up toward mounting bar assembly 14, guide shafts 22 and 24 and linear transducer 26 move further and further into their respective shaft housings 54 and 56 and sensor receiver housing 62 of the transducer housing.

As indicated above, the engaged position is for moving horn 18 into forced contact with parts (which are to be welded together by welder 10). As such, in the engaged position, the top body portion of transducer housing 16 is positioned away from the bottom body portion of mounting bar assembly 14. Screw 20 partially extends into threaded screw receiver 52 of transducer housing 16, guide shafts 22 and 24 partially extend through shaft housings 54 and 56 of the transducer housing, and linear transducer 26 partially extends through sensor receiver housing 62 of the transducer housing. In operation, screw 20 is rotated upon being driven by motor 12 to engage less threads of threaded screw receiver 52 in order to move upward from the threaded screw receiver. This effectively vertically pushes transducer housing 16 away mounting bar assembly 14. As transducer housing 16 vertically moves down and away from mounting bar assembly 14, guide shafts 22 and 24 and linear transducer 26 move further and further out of their respective shaft housings 54 and 56 and sensor receiver housing 62 of the transducer housing.

As motor 12 effectively controls the vertical movement of transducer housing 16, the movement and positioning of horn 18 is electronically controlled. As such, precise positioning of horn 18 relative to parts as well as precise movement (i.e., speed, acceleration, etc.) of the horn relative to the parts is enabled as motor 12 can be precisely controlled by a processor such as a PLC. Further, the amount of pressure applied by horn 18 onto parts in which it is in forced contact with can be controlled and varied (i.e., increased or decreased) in response to the processor controlling motor 12 appropriately. For instance, upon horn 18 being brought into forced contact with parts, the processor may continue driving motor 12 to move the horn into further contact with the parts which effectively increases the pressure applied by the horn onto the parts.

The advantages of welder 10 include having a relatively low height profile. The relatively low height profile is a result of screw 20 of mounting bar assembly 14 being integrally connected within transducer housing 16 as described above as opposed to being connected to a top face of the transducer housing. Another advantage of welder 10 includes providing proper linear guidance to horn 18 as the horn is brought into forced contact with parts. This proper linear guidance applied to horn 18 is a result of guide shafts 22 and 24 being integrally connected within transducer housing 16 as described above.

A welding system in accordance with the present invention may include a plurality of welders 10 (i.e., a multi-welder unit environment). In this case, a single processor such as a PLC may be used to control the operation of all of the welders.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A welder comprising:
a housing having top and bottom ends, the housing having a fastener receiver extending from within the housing out through the top end of the housing;
vibration means mounted within the housing adjacent to the bottom end of the housing;
a horn mounted to the bottom end of the housing such that the horn vibrates as the vibration means vibrate;
a motor having a shaft; and
a mounting assembly having a body and a fastener, the fastener having top and bottom ends, the top fastener end being connected within the mounting assembly body to the motor shaft such that the fastener rotates as the motor shaft is being driven, the bottom fastener end extending out of the mounting assembly body through the top end of the housing into a portion of the fastener receiver, wherein the fastener pulls the housing with the horn vertically upward towards the mounting assembly body upon rotation of the fastener in a first direction causing the fastener to extend into a larger portion of the fastener receiver, wherein the fastener pushes the housing with the horn vertically downward away from the mounting assembly body upon rotation of the fastener in a second direction opposite the first direction causing the fastener to extend into a smaller portion of the fastener receiver.

2. The welder of claim 1 wherein:
the housing further includes a pair of shaft openings extending from within the housing out through the top end of the housing;
the mounting assembly further includes a pair of guide shafts, each guide shaft having a top and bottom end, the top guide shaft ends being fixed in place within the mounting assembly body and the bottom guide shaft ends extending out of the mounting assembly body through the top end of the housing into portions of the respective shaft openings to thereby provide linear rigidity to the horn as the horn is brought into forced contact with parts to be welded.

3. The welder of claim 2 wherein:
the bottom guide shaft ends extend into larger portions of the respective shaft openings as the housing with the horn moves vertically upward towards the mounting assembly body;
wherein the bottom guide shaft ends extend into smaller portions of the respective shaft openings as the housing with the horn moves vertically downward away from the mounting assembly body.

4. The welder of claim 2 further comprising:
a linear transducer having top and bottom ends, the linear transducer operable for generating a position signal indicative of a location along its length that is being pinched;
wherein the housing further includes a sensor receiver opening extending from within the housing out through the top end of the housing;
wherein the top end of the linear transducer is fixed in place within the mounting assembly body and the bottom end of the linear transducer extends out of the mounting assembly body through the top end of the housing into the sensor receiver opening;
wherein the sensor receiver opening of the housing includes a pinching insert which pinches the linear transducer at a given location along the length of the linear transducer whereby the position signal generated by the linear transducer is indicative of the vertical location of the horn relative to the mounting body assembly.

5. The welder of claim 4 wherein:
the motor shaft is driven upon the motor receiving an electrical signal from a processor, said processor is a programmable logic converter (PLC);
wherein the linear transducer provides the position signal to the processor for the processor to monitor the position of the horn in order to provide proper electrical signals to the motor to effect a desirous welding result.

6. The welder of claim 1 further comprising:
a linear transducer having top and bottom ends, the linear transducer operable for generating a position signal indicative of a location along its length that is being pinched;
wherein the housing further includes a sensor receiver opening extending from within the housing out through the top end of the housing;
wherein the top end of the linear transducer is fixed in place within the mounting assembly body and the bottom end of the linear transducer extends out of the mounting assembly body through the top end of the housing into the sensor receiver opening;
wherein the sensor receiver opening of the housing includes a pinching insert which pinches the linear transducer at a given location along the length of the linear transducer whereby the position signal generated by the linear transducer is indicative of the vertical location of the horn relative to the mounting body assembly.

7. The welder of claim 6 wherein:
the bottom linear transducer end extends into a larger portion of the sensor receiver opening as the housing with the horn moves vertically upward towards the mounting assembly body;
wherein the bottom linear transducer end extends into a smaller portion of sensor receiver opening as the housing with the horn moves vertically downward away from the mounting assembly body.

8. The welder of claim 6 wherein:
the pinching insert is mounted to the top end of the housing.

9. The welder of claim 1 wherein:
the fastener receiver of the housing is a threaded screw receiver and the fastener of the mounting assembly is a threaded screw.

10. The welder of claim 9 wherein:
the housing further includes a nut mounted to the top end of the housing, the nut extending within a portion of the housing and being secured around the threaded screw receiver.

11. The welder of claim 9 wherein:
the housing further includes a set screw, wherein the set screw is positioned adjacent to the threaded screw receiver to set a maximum limit of the extension of the screw into the threaded screw receiver.

12. The welder of claim 1 wherein:
the vibration means include an ultrasonic transducer and the horn is an ultrasonic horn.

13. The welder of claim 1 wherein:
the mounting assembly further includes a coupler which connects the motor shaft to the top fastener end such that the fastener rotates as the motor shaft is being driven.

14. The welder of claim 1 wherein:
the motor shaft is driven upon the motor receiving an electrical signal from a processor said processor is a programmable logic converter (PLC).

15. An ultrasonic welder comprising:

a housing having top and bottom ends, the housing having a threaded screw receiver extending longitudinally within a portion of the housing above the bottom end of the housing and out through the top end of the housing;

an ultrasonic transducer mounted within the housing adjacent to the bottom end of the housing;

an ultrasonic horn mounted to the bottom end of the housing to be positioned adjacent to the exterior surface of the bottom end of the housing such that the ultrasonic horn vibrates as the ultrasonic transducer is being supplied with power;

a motor having a shaft, wherein the motor drives the shaft upon being supplied with power;

a screw having top and bottom ends, the screw is rotatable in first and second opposite directions, the top end of the screw being connected to the motor shaft such that the screw rotates as the motor shaft is being driven, the bottom end of the screw longitudinally extending through the top end of the housing into the threaded screw receiver, wherein the screw extends further into the threaded screw receiver by engaging more threads of the threaded screw receiver as the screw rotates in the first direction such that the housing with the horn moves vertically upward, wherein the screw extends further out of the threaded screw receiver by engaging less threads of the threaded screw receiver as the screw rotates in the second direction such that the housing with the horn moves vertically downward.

16. The welder of claim 15 wherein:

the housing further includes a pair of shaft openings extending longitudinally within respective portions of the housing above the bottom end of the housing and out through the top end of the housing;

the welder further comprising a pair of guide shafts, each guide shaft having a top and bottom end, the top guide shaft ends being fixed in place to a housing of the motor and the bottom guide shaft ends longitudinally extending through the top end of the housing into portions of the respective shaft openings to thereby provide linear rigidity to the horn as the horn is brought into forced contact with parts to be welded.

17. The welder of claim 16 further comprising:

a linear transducer having top and bottom ends, the linear transducer operable for generating a position signal indicative of a location along its length that is being pinched;

wherein the housing further includes a sensor receiver opening longitudinally extending within a portion of the housing above the bottom end of the housing and out through the top end of the housing;

wherein the top end of the linear transducer is fixed in place to the motor housing and the bottom end of the linear transducer longitudinally extends through the top end of the housing into the sensor receiver opening;

wherein the sensor receiver opening of the housing includes a pinching insert which pinches the linear transducer at a given location along the length of the linear transducer whereby the position signal generated by the linear transducer is indicative of the vertical location of the horn relative to the given location.

18. The welder of claim 15 further comprising:

a linear transducer having top and bottom ends, the linear transducer operable for generating a position signal indicative of a location along its length that is being pinched;

wherein the housing further includes a sensor receiver opening longitudinally extending within a portion of the housing above the bottom end of the housing and out through the top end of the housing;

wherein the top end of the linear transducer is fixed in place to the motor housing and the bottom end of the linear transducer longitudinally extends through the top end of the housing into the sensor receiver opening;

wherein the sensor receiver opening of the housing includes a pinching insert which pinches the linear transducer at a given location along the length of the linear transducer whereby the position signal generated by the linear transducer is indicative of the vertical location of the horn relative to the given location.

* * * * *